United States Patent [19]

Kanno

[11] Patent Number: 4,881,425
[45] Date of Patent: Nov. 21, 1989

[54] PARKING-BRAKE OPERATING DEVICE

[75] Inventor: Kimio Kanno, Toyota, Japan

[73] Assignee: Toyoda Iron Works Co., Ltd., Aichi, Japan

[21] Appl. No.: 338,094

[22] Filed: Apr. 14, 1989

Related U.S. Application Data

[62] Division of Ser. No. 199,146, May 26, 1988.

[51] Int. Cl.$^4$ .............................................. G05G 1/10
[52] U.S. Cl. ....................................... 74/538; 74/523; 74/528; 74/543; 74/557
[58] Field of Search ............... 74/523, 524, 525, 528, 74/536, 538, 543, 553, 555, 556, 557, 473 P

[56] References Cited

U.S. PATENT DOCUMENTS

| | | | |
|---|---|---|---|
| 3,216,276 | 11/1965 | Nagy | 74/538 X |
| 3,731,272 | 5/1973 | Crylr | 74/538 X |
| 3,998,109 | 12/1976 | O'Brien | 74/538 X |
| 4,569,246 | 2/1986 | Katayama et al. | 74/523 |
| 4,603,598 | 8/1986 | Tsuji et al. | 74/473 P |
| 4,747,278 | 5/1988 | Roncelli et al. | 74/538 X |
| 4,770,057 | 9/1988 | Foggini | 74/523 |

FOREIGN PATENT DOCUMENTS

| | | | |
|---|---|---|---|
| 2735895 | 2/1973 | Fed. Rep. of Germany | 74/553 |
| 2950534 | 7/1981 | Fed. Rep. of Germany | 74/523 |
| 2582272 | 11/1986 | France | 74/538 |
| 111056 | 8/1981 | Japan | 74/528 |
| 119760 | 9/1981 | Japan | 74/528 |
| 218460 | 9/1986 | Japan | 74/538 |
| 791499 | 3/1958 | United Kingdom | 74/553 |
| 1208724 | 10/1970 | United Kingdom | 74/553 |

Primary Examiner—Vinh Luong

[57] ABSTRACT

A device for selectively placing an automobile's parking brake in its operative and inoperative positions, including (a) a pivotable lever connected to the brake via a cable; (b) a stationary sector having a plurality of teeth; (c) a pawl pivotably supported by the lever and engageable at its first arm with the sector's teeth; (d) a knob fitted over its axial part in a longitudinal hole formed in a lever's free-end portion, the knob being retractable inward upon pushing thereof; (e) a release rod connected at its first end to a pawl's second arm and including a head fitted in a recess formed in the knob's part; (f) a first spring permitting the pawl to be pivoted in a direction in which to cause its first arm to be engaged with the sector; and (g) a second spring fitted in the knob's recess to bias the rod's head to be engaged with a stopper provided in the recess. The knob has a cylindrical shape and is fitted in the lever's longitudinal hole about its axis, while the rod's head has a pair of opposite side surfaces fitly engageable with a pair of opposed wall surfaces of the knob's recess, respectively, whereby the knob is not rotatable in the lever's longitudinal hole. Another embodiment of the device includes the above elements (a)–(g) and a sleeve having an inside hole through which a shaft of the release rod in place extends.

6 Claims, 2 Drawing Sheets

PARKING-BRAKE OPERATING DEVICE

This is a Division of application Ser. No. 07/199,146 filed on May 26, 1988 pending.

BACKGROUND OF THE INVENTION

1. Field of the Invention

The present invention relates to a parking-brake operating device for selectively placing a parking brake of an automotive vehicle in its operative and inoperative positions, and particularly to improvements of such devices which are adapted to prevent the parking brake from being erroneously released from its operative position to its inoperative position, for example upon erroneus operation or pushing of the associated knob.

2. Priort Art Statement

A variety of parking-brake operating devices have been used for selectively placing an automobile's parking brake in its operative and inoperative positions. The Japanese Utility Model Laid-Open Publication No. 56-119760 discloses one example of such parking-brake operating devices, which includes (a) an operating lever which is selectively placed in its first and second positions to place the parking brake in its operative and inoperative positoins, respectively, the lever being disposed pivotably about a first pivot axis and connected to the parking brake through a brake cable, the lever including a free-end portion having a free end, the portion having a longitudinal hole which is formed therein longitudinally of the lever and is open in the free end; (b) a stationary sector having a plurality of teeth; (c) a pawl supported by the lever pivotably about a second pivot axis parallel to the first pivot axis, the pawl having a first and a second arm; (d) a knob having a first and a second end, and fitted, over an axial part thereof having the first end, in the longitudinal hole of the lever such that the knob is retractable inward upon operation thereof on the second end, the axial part having an axial recess which is formed therein and is open in the first end and a lateral surface adjacent to the first end, the knob having at its first end a stopper protruding radially inward from an inner wall surface thereof defining the axial recess; (e) a release rod having a first and a second end, the second arm of the pawl being connected to the first end, the rod including a head having the second end, the head being fitted in the axial recess of the knob such that the head is engageable with the stopper; (f) a first spring possessing a first biasing force for permitting the pawl to be pivoted about the second pivot axis in a first direction in which to cause the first arm of the pawl to be engaged with the teeth of the sector; and (g) a second spring fitted in the axial recess of the knob and possessing a second biasing force for permitting the head of the rod to be engaged with the stopper of the knob, the second biasing force being determined such that, upon retraction of the knob when the lever is held in its second position, the second spring causes the rod to be moved relative to the lever with the head engaged with the stopper, whereby the pawl is pivoted in a second direction opposite to the first direction and released from the engagement with the sector, and that, upon retraction of the knob when the lever is held in its first position, the second spring permits the knob to be moved relative to the rod, while the second biasing force is overcome by pivot resistance associated with the forced engagement between the pawl and the sector due to a tension force of the brake cable, whereby the rod is not moved relative to the lever and the pawl is not released from the forced engagement with the sector.

This parking-brake operating device is adapted to prevent the parking brake from being erroneously released from its operative position to its inoperative position, for example when the knob is erroneously operated or pushed inward in the longitudinal hole of the operating lever. In such cases, the second spring is deformed, permitting the knob to be moved relative to the release rod. Thus, the parking brake of the prior-art operating device does provide an operator with a degree of safety. Further, since the second spring and the head of the release rod are received in the axial recess of the knob through the opening of the axial recess in the lateral surface of the knob, the operating device is easily fabricated within a short time. The parking brake of the prior art is released from its operative position to its inoperative position by pivoting the lever about the first pivot axis, specifically by slightly raising the lever, and that releases the pawl from the forced engagement with the sector due to the tension force of the brake cable and subsequently pushes the knob inward in the longitudinal hole of the lever.

Problems Solved by the Invention

However, the prior-art parking-brake operating device of the above-indicated type has a problem in that the knob is unstable to operate because of the rotation thereof about its axis upon its operation. Specifically described, since the knob has a cylindrical shape and is fitted in the longitudinal hole of the operating lever such that the knob is rotatable about its axis, and the head of the release rod that has a circular transverse cross section, this permits the knob to be rotated about its axis relative thereto upon operation of the knob.

Moreover, the operating device has suffered from another problem in that an abnormal noise results from the interferance between the head of the release rod and an inner wall surface of the lever which defines the longitudinal hole. In fabricating the device, the knob is connected to the release rod such that the rod's head is received in the axial recess of the knob through the opening of the axial recess in the lateral surface of the knob and is biased against the stopper of the knob due to the biasing force of the second spring, and subsequently the knob is fitted in the longitudinal hole of the operating lever. Consequently, the head of the release rod cannot slip out of the axial recess of the knob. However, the release rod, thus disposed in the operating lever, rattles in the longitudinal hole of the lever, for example during running of the automotive vehicle, whereby generating the abnormal noise.

SUMMARY OF THE INVENTION

It is therefore an object of the present invention to provide a parking-brake operating device wherein the knob is prevented from being rotated upon operation thereof, for improving the operating stability thereof.

The above-indicated object has been achieved by the present invention. According to one aspect of the invention, a parking-brake operating device is provided including (a) an operating lever; (b) a stationary sector; (c) a pawl; (d) a knob; (e) a release rod; (f) a first spring; and (g) a second spring, and characterized in that the knob has a cylindrical shape and is fitted in the longitudinal hole of the operating lever the head of the release rod has a pair of opposite side surfaces, the inner wall surface of the knob includes a pair of opposed wall surfaces, and the head is fitted in the axial recess of the knob such that the pair of opposite side surfaces of the head are fitly engaged with the pair of opposed wall surfaces of the inner wall surface, respectively, whereby the knob is not rotatable about its axis in the longitudinal hole of the lever.

In the parking-brake operating device constructed as described above, the cylindrical knob which is fitted in the longitudinal hole of the operating lever, is prevented from being rotated, because of the engagement between the pair of opposite side surfaces of the head of the release rod and the pair of opposed wall surfaces of the inner wall surface of the knob. Thus, the knob does not rotate and is operated with stability. This stability improves the driver's operating feeling with the knob or the parking-brake operating device.

It is another object of the invention to provide a parking-brake operating device wherein the rattling of the release rod in the longitudinal hole of the lever is advantageously restrained for preventing abnormal noise otherwise resulting therefrom.

The above object has also been achieved by the present invention. According to another aspect of the invention, there is provided a parking-brake operating device including (a) an operating lever; (b) a sector; (c) a pawl; (d) a knob; (e) a release rod; (f) a first spring; and (g) a second spring, and characterized by comprising an annular sleeve disposed in the longitudinal hole of the operating lever, the annular sleeve having an inside hole formed therethrough axially thereof, the release rod being disposed in the longitudinal hole such that a shaft of the rod extends through the inside hole of the sleeve, whereby interferance between the head of the rod and the lever is prevented.

In the parking-brake operating device constructed as described above according to the second aspect of the invention, the rattling of the release rod is advantageously restrained by the annular sleeve, and consequently abnormal noise otherwise generated by interferance between the head of the release rod and the operating lever is avoided.

In one embodiment of the parking-brake operating device in accordance with the second aspect of the invention, the head of the release rod consists of a central portion aligned with the shaft and a peripheral portion protruding radially outwardly from the central portion, a minimum wall thickness of the annular sleeve being greater than a maximum radial dimension of the peripheral portion of the head.

In another embodiment of the parking-brake operating device in accordance with the second aspect of the invention, the operating lever has a spring seat provided on an inner wall surface thereof defining the longitudinal hole, the first spring consisting of a compression coil spring, the coil spring resting on the spring seat and surrounding a part of the shaft of the release rod, the annular sleeve being disposed between the coil spring and the knob, the coil spring biasing the annular sleeve for advancing the knob outward in the longitudinal hole, so as to cause the the pawl to be engaged with the sector.

In yet another embodiment of the parking-brake operating device in accordance with the second aspect of the invention, the first spring consists of a compression coil spring having an inside space, a size of the head of the release rod, a size of the inside hole of the annular sleeve and a size of the inside space of the coil spring being determined such that each of the inside hole and the inside space permits the head of the release rod to be passed therethrough. In this case, the compression coil spring and the annular sleeve are mounted on the device easily and in a short time by passing the spring and the sleeve through around the head and subsequently shaft of the release rod with the head temporarily located outside the longitudinal hole and with the first end of the rod connected to the pawl.

In a further embodiment of the parking-brake operating device in accordance with the second aspect of the invention, the knob has a cylindrical shape and is fitted in the longitudinal hole such that the knob is rotatable about an axis thereof in the longitudinal hole, the head of the release rod has a pair of opposite side surfaces, the inner wall surface of the knob includes a pair of opposed wall surfaces, and the head of the release rod is fitted in the axial recess of the knob such that the pair of opposite side surfaces of the head are fitly engaged with the pair of opposed wall surfaces of the inner wall surface, respectively, whereby the knob is not rotatable about its axis in the longitudinal hole. In this case, the operating device has an additional advantage similar to that with the operating device in accordance with the first aspect of the invention, i.e., the advantage of improved operating stability of the knob.

BRIEF DESCRIPTION OF THE DRAWINGS

The above and additional objects, features and advantages of the present invention will be more apparent by reading the following detailed description of preferred embodiments of the invention in conjunction with with the accompanying drawings, in which.

DETAILED DESCRIPTION OF THE PREFERRED EMBODIMENTS

The following will described in detail one embodiment of the parking-brake operating device in accordance with the present invention, for selectively placing a parking brake of an automotive vehicle in its operative and inoperative positions.

Figure 1:
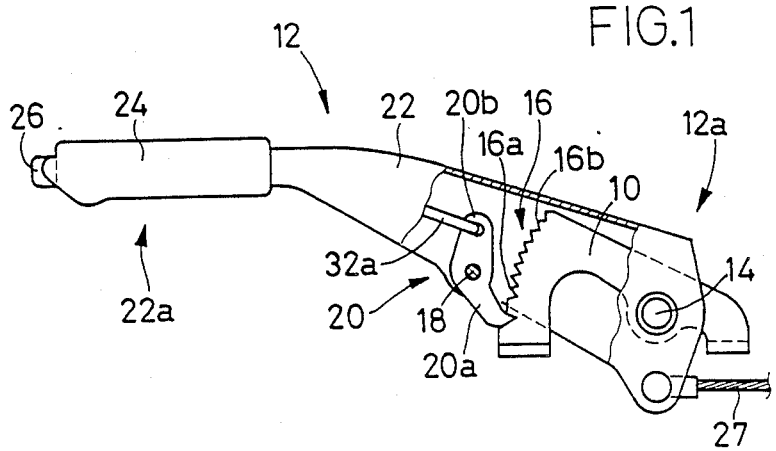
FIG. 1 is a front elevational view of an embodiment of the parking-braking operating device according to the present invention, with a part thereof removed.

In FIG. 1, reference numeral 10 designates a stationary sector secured to a floor (not shown) of the automotive vehicle. The sector 10 is provided with an axis member (first pivot axis) 14, and a plurality of teeth 16 which are formed along an arc whose center is located at the axis member 14. An operating lever 12 is supported at a base portion 12a thereof by the sector 10 such that the lever 12 is pivotable about the axis member 14. The base portion 12a is connected to the parking brake (not shown) via a brake cable 27. The operating lever 12 is selectively placed in its first (upper) and second (lower) positions to place the parking brake in its operative and inoperative positions, respectively. The teeth 16 of the sector 10 include at least one first tooth 16a, and at least one second tooth 16b positioned above the first tooth 16a, as illustrated in FIG. 1. The operating lever 12 is provided with a pin (second pivot axis) 18 parallel to the first pivot axis 14, and a pawl 20 is supported by the lever 12 such that the pawl 20 is pivotable about the pin 18. The pawl 20 has a first and a second arm 20a, 20b, and is engageable at its first arm 20a with each tooth 16 of the sector 10. The first arm 20a is engaged with the low-positioned first tooth 16a of the sector 10 when the lever 12 is held in its second position, while the first arm 20a is forcedly engaged with the high-positioned second tooth 16b, due to a tension force of the brake cable 27, when the lever 12 is held in its first position.

The operating lever 12 consists of a lever body 22 formed of metal, and a grip 24 formed of resin which is fitted on an outside surface of a free-end portion 22a of the lever body 22. The free-end portion 22a includes a free end 22b, and has a longitudinal, cylindrical hole 13 which is formed therein longitudinally of the lever 12 and is open in the free end 22b. A knob 26 is fitted in the longitudinal hole 13 such that the knob 26 is movable or retractable inward in the hole 13 upon operation or pushing thereof.

Figure 2:
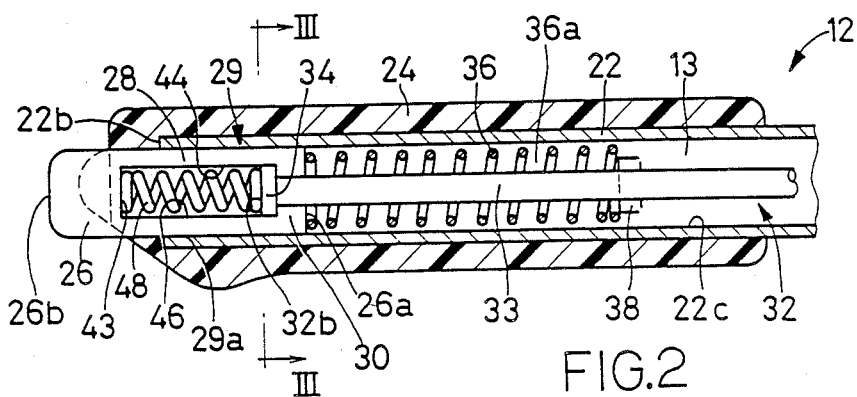
FIG. 2 is a longitudinal cross-sectional view of a free-end portion of an operating lever of the device of FIG. 1.
Figure 3:
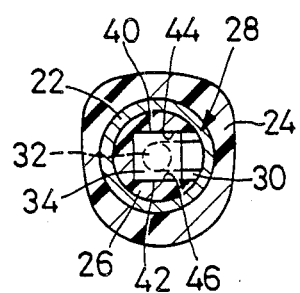
FIG. 3 is a transverse cross-sectional view taken along line III—III of FIG. 2.

As shown in FIGS. 2 and 3, the knob 26 has a cylindrical shape, and is fitted in the longitudinal hole 13 rotatably about an axis thereof. The knob 26 includes an axial part 29 over which the knob 26 is fitted in the longitudinal hole 13. The axial part 29 includes a first end 26a and has a generally rectangular axial recess 28 formed therein axially of the knob 26. The axial recess 28 is open in both the first end 26a and a lateral surface 29a adjacent to the first end 26a. The axial recess 28 is defined by an inner wall surface 43 which includes a pair of opposed wall surfaces 44, 46 parallel to each other. A stopper in the form of a flange 30 protrudes radially inward from the inner wall surface 43. The knob 26 has a second end 26b on which the operator or driver pushes the knob 26 to operate the instant device.

A release rod 32 includes a head 34 which is received in the axial recess 28 through the opening of the recess 28 in the lateral surface 29a, and a shaft 32a extending through the opening of the recess 28 in the first end 26a. The head 34 is movable in the axial recess 28 so that the head 34 is engageable with the stopper 30. The release rod 32 is connected at a first end 32a thereof to the second arm 20b of the pawl 20 such that the rod 32 is not rotatable about its axis. A compression coil spring (first spring) 36 is disposed around a part of the shaft 32a of the rod 32, and has an inside space 36a whose size permits the head 34 to be passed therethrough. The first spring 36 rests on a spring seat 38 provided on an inner wall surface 22c defining the longitudinal hole 13, and biases the knob 26 outward in the hole 13 so as to permit the pawl 20 to be pivoted about the pin 18 in a first direction in which to cause the first arm 20a to be engaged with each tooth 16 of the sector 10.

The head 34 of the release rod 32 has a generally rectangular transverse cross section and includes a second end 32b. The head 34 has a pair of opposite side surfaces 40, 42 which are parallel to each other and are fitly engaged with the pair of opposed wall surfaces 44, 46 of the axial recess 28 of the knob 26, respectively, with the head 34 fitted in the recess 28. That is, the opposite side surfaces 40, 42 and the corresponding opposed wall surfaces 44, 46 are parallel to each other, respectively. Thus, the knob 26 is prevented from being rotated relative to the release rod 32. Since the release rod 32 is connected to the pawl 20 such that the rod 32 is not rotatable about its axis, the knob 26 is not rotatable about its axis in the longitudinal hole 13 of the lever 12, upon operation thereof by the operator or driver.

A compression coil spring (second spring) 48 is received in the axial recess 28 through the lateral opening of the recess 28 in the lateral surface 29a, and biases the second end 32b of the release rod 32 for engaging the head 34 with the stopper 30. The second spring 48 has a biasing force that, upon operation of the knob 26 when the lever 12 is held in its second or lower position, causes the rod 32 to be moved relative to the lever 12 with the head 34 engaged with the stopper 30, whereby the pawl 20 is pivoted in a second direction opposite to the above-indicated first direction and consequently the pawl 20 is released from the engagement with the sector 10. Meanwhile, upon operation of the knob 26 when the lever 12 is held in its first or upper position, the second spring 48 is deformed, permitting the knob 26 to be moved relative to the rod 32, while a biasing force of the second spring 48 is overcome by pivot resistance associated with the forced engagement between the pawl 20 and the sector 10 due to the tension force of the brake cable 27, whereby the rod 32 is not moved relative to the lever 12 and the pawl 20 is not pivoted about the pin 18 and consequently is not released from the forced engagement with the sector 10. Thus, the instant parking-brake operating device serves to prevent the parking brake from being erroneously released from its operative position to its inoperative position, for example upon erroneous operation or pushing of the knob 26.

There will be described the operation of the parking-brake operating device constructed as described above.

As the operator or driver raises the operating lever 12 from in its second or lower position by grasping the grip 24, namely, pivots the lever 12 about the axis member (first pivot axis) 14 clockwise as viewed in FIG. 1, the brake cable 27 is gradually tensed and the parking brake (not shown) is eventually placed in its operative position. In this process, if the driver concurrently pushes the knob 26 in the longitudinal hole 13 of the lever 12, the release rod 32 is moved together with the knob 26, whereby the pawl 20 is pivoted about the pin (second pivot axis) 18 in the above-indicated second direction and the first arm 20a of the pawl 20 is released from the engagement with the first tooth 16a of the sector 10. Conversely, if the driver does not push the knob 26 when raising the lever 12, the pawl's first arm 20a climbs over the teeth 16 one by one while overcoming the biasing force of the first spring 36.

In the case where the knob 26 is operated concurrently when the operating lever 12 is raised, the first arm 20a of the pawl 20 is eventually engaged with the second tooth 16b upon stopping operating the knob 26, due to the biasing force of the first spring 36. In the case where the lever 12 is raised without pushing of the knob 26, the pawl's first arm 20a is also engaged with the second tooth 16b as a result of its successive climbings over the teeth 16. Thus, in either case, the lever 12 is prevented from being returned to its lower position, and accordingly the parking brake is held in its operative position even after the driver stops applying the operating force to the lever 12 by releasing his hand from the grip 24.

When the operating lever 12 is held in its first or upper position, the brake cable 27 has a comparatively high tension force that is sufficient to hold the parking brake in its operative position in which the brake serves to keep the vehicle parked. The tension force of the brake cable 27 is applied to the sector 10 via the operating lever 12, pin 18 and pawl 20. Accordingly, the first arm 20a of the pawl 20 is forcedly engaged with the second tooth 16b of the sector 10, whereby is produced a comparatively great pivot resistance against the pivotal movement of the pawl 20 about the pin 18 in the above-mentioned second direction (clockwise as viewed in FIG. 1).

As previously described, the release rod 32 is adapted to release the pawl 20 from the engagement with the first tooth 16a of the sector 10 by means of movement thereof relative to the lever 12 upon operation of the knob 26, when the lever 12 is held in its second or lower position. Meanwhile, the release rod 32 is connected to the knob 26 via the second spring 48, and the biasing force of the second spring 48 is determiend such that, upon operation of the knob 26 when the lever 12 is held in its first position, the second spring 48 is deformed due to the pivot resistance associated with the forced engagement between the pawl 20 and the sector 10 due to the tension force of the tensed brake cable 27. In the latter case, the rod 32 is not moved even when the knob 26 is pushed, and the parking brake is held in its operative position.

In order to release the pawl 20 from the forced engagement with the sector 10 when the level 12 is held in its first or upper position, it is required to apply an upward-oriented operating force to the operating lever 12 so as to eliminate the pivot resistance. After the pivot resistance is thus eliminated, only the biasing force of the first spring 36 remains to maintain the engagement between the pawl 20 and the sector 10. The biasing force of the second spring 36 is high enough to permit, upon operation of the knob 26, the release rod 32 to be moved together with the knob 26, namely, without relative movement of the rod 32 to the knob 26, whereby the pawl 20 is pivoted in the second direction and released from the engagement with the sector 10. Subsequently, as the operating lever 12 is tilted down, namely, pivoted to its lower position, the tension force of the brake cable 27 is gradually lowered and the parking brake is eventually placed in its inoperative position. In this process, the driver may push the knob 26 while applying the upward-oriented force to the lever 12.

As can be apparent from the foregoing description, the instant parking-brake operating device does not permit the parking brake to be erroneously released from its operative position, for example when the knob 26 is erroneously operated or pushed. Thus, the parking brake of the instant operating device provides an additional safety feature.

The release rod 32, first and second springs 36, 48 and knob 26 are mounted on the operating lever 12 in the following steps: first, the first spring (compression coil spring) 36 is inserted into the longitudinal hole 13 of the lever 12 through around the head 34 of the release rod 32 with the head 34 temporarily located outside the hole 13 and with the rod 32 connected at its first end 32a to the pawl 20; then, the head 34 is fitted in the axial recess 28 through the opening of the recess 28 in the first end 26a and lateral surface 29a, and subsequently the second spring (compression coil spring) 48 is also fitted in the recess 28 to bias the head 34 against the stopper 30; and the knob 26 is retracted over a suitable length inward in the hole 13 against the biasing force of the first spring 36 and in this state the pawl 20 is pivotably secured to the lever 12 with the help of the pin 18. In this way, the members 32, 36, 48, 26, 20, 18 are fabricated easily and in a short time.

In the instant parking-brake operating device, the rod's head 34 has a generally rectangular transverse cross section and the pair of opposite side surfaces 40, 42 of the head 34 are fitly or tightly engaged with the pair of opposed wall surfaces 44, 46 of the recess 28, whereby the knob 26 which is rotatably fitted in the longitudinal hole 13 of the lever 12, is prevented from being rotated in the hole 13 upon operation thereof. Thus, the operating stability of the knob 26 is improved.

While the rod's head 34 of the illustrated embodiment has a generally rectangular cross section, shapes of the rod's head and corresponding knob's axial recess may be otherwise changed.

Figure 4:
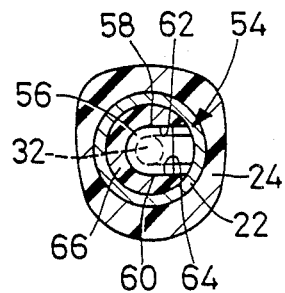
FIG. 4 is a cross sectional view corresponding to FIG. 3, showing another embodiment of the device of FIG. 1.

For example, in FIG. 4 there is illustrated another embodiment of the parking-brake operating device in accordance with the present invention. In the figure, the same reference numerals as used in FIGS. 1-3 are used to designate the corresponding elements, and further description of those elements are omitted for brevity's sake.

A knob 66 of the instant operating device has an axial recess 54 having a generally U-shape transverse cross section. Specifically described, the recess 54 is defined by a bottom surface having a semi-circular transverse cross section, and a pair of opposed wall surfaces 62, 64. Meanwhile, a release rod 32 includes a head 56 which has a transverse cross section corresponding to the semi-circular section of the axial recess 54. Thus, a pair of opposite side surfaces 58, 60 of the head 56 are fitly engaged with the pair of opposed wall surfaces 62, 64 of the recess 54, respectively, with the head 56 fitted in the recess 54, whereby the knob 66 is not rotatable in a longitudinal hole of a lever body 22.

In each of the two embodiments shown in FIGS. 1-3 and 4, the pair of opposite side surfaces of the head of the release rod are engaged with the pair of opposed wall surfaces of the axial recess of the knob, respectively. Accordingly, the knob is prevented from being rotated about its axis in the longitudinal hole of the operating lever, when the knob is operated by the driver to selectively place the parking brake in its operative and inoperative positions.

Figure 5:
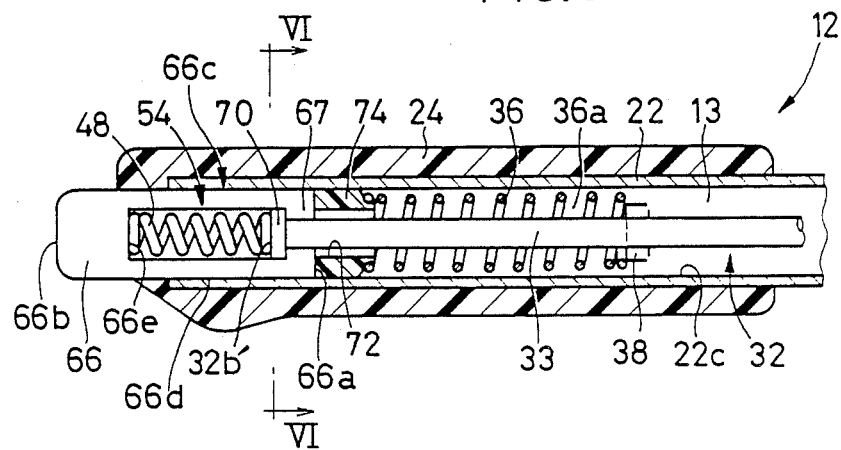
FIG. 5 is a longitudinal cross-sectional view, corresponding to FIG. 2, showing a further embodiment of the parking-brake operating device of the invention.
Figure 6:
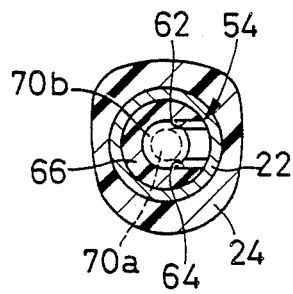
FIG. 6 is a transverse cross-sectional view taken along line VI—VI of FIG. 5.

Referring next to FIGS. 5 and 6, there will be described a third embodiment of the parking-brake operating device in accordance with the present invention. The same reference numerals as used in FIGS. 1-4 are used in FIGS. 5 and 6 to denote the corresponding elements, and a further description of those elements is omitted.

A cylindrical knob 66, similar to the knob 66 shown in FIG. 4, is fitted in a longitudinal, cylindrical hole 13 of an operating lever 12 such that the knob 66 is retractable inward in the hole 13. The knob has a stopper 67 and a first and second end 66a, 66b, and is fitted over an axial part 66c thereof in the hole 13. The knob 66 has an axial recess 54 which is open in the first end 66a and a lateral surface 66d and whose bottom has a sectorial transverse cross section. A release rod 32 has a head 70 which includes a second end 32b' and has a circular cross section whose radius corresponds to a radius of curvature of the sectorial cross section of the recess 54. Between the first end 66a of the knob 66 and a first spring (compression coil spring) 36, is disposed an annular sleeve 74 formed of resin. The sleeve 74 has a cylindrical inside hole 72 formed therethrough having a diameter greater than an outside diameter of the rod's head 70. The sleeve 74 has an outside diameter slightly smaller than a diameter of the longitudinal hole 13 of the operating lever 12 so that the sleeve 74 is slidably fitted in the hole 13. The inside hole 72 is concentric with the sleeve 74 and accordingly the sleeve 74 has a constant wall thickness. The release rod 32 is disposed in position in the hole 13 such that a shaft 33 of the rod 32 extends through the inside hole 72 of the sleeve 74. The shaft 33 has a circular transverse cross section. The head 70 consists of a central portion 70a aligned with the shaft 33, and a peripheral portion 70b which extends radially outwardly from the central portion 70a, and is concentric with the shaft 33. The constant wall (radial) thickness of the sleeve 74 is determined to be greater than a difference between radii of the central portion 70a (or shaft 33) and the peripheral portion 70b. Thus, if the release rod 32 is rattled in the longitudinal hole 13 of the lever body 22 (operating lever 12), the sleeve 74 serves to avoid interference between the head 70 and the lever body 22.

In the instant parking-brake operating device, the displacement of the rod's shaft 33 in the sleeve's inside hole 72 is permitted only within a length of the diameter of the hole 72, so that the rattling of the rod 32 is effectively restrained. Accordingly, generation of abnormal noise resulting from interferance between the head 70 and the lever body 22 is prevented.

Since the diameter of the sleeve's inside hole 72 is determined to be greater than the outside diameter of the rod's head 70, the sleeve 74 is easily inserted, after inserting of the first spring 36, into the longitudinal hole 13 of the lever body 22 through around the rod's head 70. While the present invention has been illustrated in detail by way of several embodiments with reference to the accompanying drawings, it is to be understood that the invention is by no means limited to the particularities of the illustrated embodiments.

For example, in the parking-brake operating device shown in FIGS. 5 and 6, it is possible to use a release rod having a head similar to the head 56 shown in FIG. 4, in place of the rod 32 having the head 70, or alternatively use a knob similar to the knob 26 having the recess 28 (FIG. 3), together with a release rod having a head similar to the head 34 (FIG. 3). In either case, a pair of opposite side surfaces (40, 42; 58, 60) of the rod's head are tightly engaged with a pair of opposed wall surfaces (44, 46; 62, 64) of the knob's axial recess, respectively, whereby the knob is prevented from being rotated about its axis in the longitudinal hole 13 of the operating lever 12. This advantage is similar to that with the operating devices shown in FIGS. 1-4.

Furthermore, in the embodiment shown in FIGS. 5 and 6, the rotation of the knob (66) in the longitudinal hole (13) of the operating lever (12) may be prevented by employing an operating lever having a longitudinal hole which has an elliptical or rectangular transverse cross section, together with a knob which has a transverse cross section corresponding to that of the longitudinal hole of the lever so as to be fitly received in the hole.

While, in the embodiment shown in FIGS. 5 and 6, the annular sleeve 74 has the cylindrical inside hole 72, it is possible to use, in place of the sleeve 74, an annular sleeve having a rectangular inside hole formed therethrough corresponding to a rectangular head of a release rod used together therewith. Moreover, the resin-based annular sleeve 74 may be replaced by an annular sleeve formed of other material, such as rubber, which material is free from abnormal noise in spite of possible interferance thereof with the rod 32.

In the embodiments shown in FIGS. 1-4, the first spring 36 consists of a compression coil spring disposed around the shaft 33 of the release rod 32, the compression coil spring 36 may be replaced by a tension or torsion coil spring which is disposed between the pawl 20 and the operating lever 12 to bias the pawl 20 in a direction in which to cause the pawl's first arm 20a to be engaged with the teeth 16 of the sector 10.

Further, in any of the illustrated embodiments, one or both of the inner wall surface 43, 66e of the axial recess 28, 54 and the second end 32b, 32b' of the rod 32 may be provided with a spring seat such as a mounting pin whose size is determined to be smaller than an inside diameter of the spring 48 so as to permit the second spring 48 to be mounted thereon. In this case, the second spring 48 may be located in position at a central position in the axial recess 28, 54.

It is to be understood that the present invention may be embodied with other changes, improvements and modifications that may occur to those skilled in the art without departing from the scope of the invention defined in the following claims.

What is claimed is:

1. A parking-brake operating device for selectively placing a parking brake in an operative and an inoperative position thereof, the device including (a) an operating lever which is selectively placed in a first and a second position thereof to place said parking brake in said operative and inoperative position, respectively, said lever being disposed pivotably about a first pivot axis and connected to said parking brake through a brake cable, said lever including a free-end portion having a free end, said portion having a longitudinal hole which is formed therein longitudinally of the lever and is open in said free end; (b) a stationary sector having a plurality of teeth; (c) a pawl supported by said lever pivotably about a second pivot axis parallel to said first pivot axis, said pawl having a first and a second arm; (d) a knob having a first and a second end, and fitted, over an axial part thereof having said first end, in said longitudinal hole of said lever such that said knob is retractable inward upon operation thereof on said second end, said axial part having an axial recess which is formed therein and is open in said first end and a lateral surface adjacent to said first end, said knob having at said first end a stopper protruding radially inward from an inner wall surface thereof defining said axial recess; (e) a release rod having a first and a second end and a shaft including said first end, said second arm of said pawl being connected to said first end, said rod including a head having said second end, said head being fitted in said axial recess of said knob such that said head is engaged with said stopper; (f) a first spring possessing a first biasing force for permitting said pawl to be pivoted about said second pivot axis in a first direction in which to cause said first arm of the pawl to be engaged with said plurality of teeth of said sector; and (g) a second spring fitted in said axial recess of said knob and possessing a second biasing force for permitting said head of said rod to be engaged with said stopper of the knob, said second biasing force being determined such that, upon retraction of said knob when said lever is held in said second position, said second spring causes said rod to be moved relative to said lever with said head engaged with said stopper, whereby said pawl is pivoted in a second direction opposite to said first direction and said first arm of the pawl is released from the engagement with said sector, and that, upon retraction of said knob when the lever is held in said first position, said second spring permits said knob to be moved relative to said rod, while said second biasing force is overcome by pivot resistance associated with the forced engagement between said pawl and said sector due to tension force of said brake cable, whereby said rod is not moved relative to said lever and said pawl is not released from said forced engagement, the improvements comprising:

an annular sleeve disposed in said longitudinal hole of said operating lever, said annular sleeve having an inside hole formed therethrough axially thereof, said release rod being disposed in said longitudinal hole such that said shaft of said rod extends through said inside hole of said annular sleeve, whereby interference between said head of the rod and said lever is prevented.

2. A parking-brake operating device as recited in claim 1, wherein said operating lever has a spring seat provided on an inner wall surface thereof defining said longitudinal hole, said first spring consisting of a compression coil spring, said coil spring resting on said spring seat and surrounding a part of said shaft of the release rod, said annular sleeve being disposed between said coil spring and said knob, said coil spring biasing said annular sleeve for advancing the knob outward in said longitudinal hole of the lever, so as to cause said said pawl to be engaged with said sector.

3. A parking-brake operating device as recited in claim 1, wherein said first spring consists of a compression coil spring having an inside space, a size of said head of said release rod, a size of said inside hole of said annular sleeve and a size of said inside space of said coil spring being determined such that said inside hole and said inside space permits said head of the rod to be passed therethrough.

4. A parking-brake operating device as recited in claim 1, wherein said head of said release rod consists of a central portion aligned with said shaft and a peripheral portion protruding radially outward from said central portion, a minimum wall thickness of said annular sleeve being greater than a maximum radial dimension of said peripheral portion of said head of the rod.

5. A parking-brake operating device as recited in claim 1, wherein said annular sleeve has a cylindrical inside hole formed therethrough axially thereof which is concentric with the annular sleeve, whereby the annular sleeve has a constant wall thickness, said head and shaft of said release rod having a circular transverse cross section and being concentric with each other, said constant wall thickness of the annular sleeve being greater than a difference between radii of the circular transverse cross sections of said head and shaft of the rod.

6. A parking-brake operating device as recited in claim 1, wherein said knob has a cylindrical shape and is fitted in said longitudinal hole of said lever such that the knob is rotatable about an axis thereof in said longitudinal hole, said head of said release rod having a pair of opposite side surfaces, said inner wall surface of said knob including a pair of opposed wall surfaces, said head of the release rod being fitted in said axial recess of the knob such that said pair of opposite side surfaces of said head are fitly engaged with said pair of opposed wall surfaces of said inner wall surface, respectively, whereby the knob is not rotatable about said axis thereof in said longitudinal hole of the lever.

* * * * *